United States Patent [19]

Franklin

[11] E Re. 29,728

[45] Reissued Aug. 15, 1978

[54] LIFESAVING DEVICE

[76] Inventor: Robert S. Franklin, 12 Blakely Cir., Randolph, Mass. 02368

[21] Appl. No.: 762,328

[22] Filed: Jan. 25, 1977

Related U.S. Patent Documents

Reissue of:

[64] Patent No.: 3,974,536
Issued: Aug. 17, 1976
Appl. No.: 580,743
Filed: May 27, 1975

[51] Int. Cl.[2] ..... B63C 9/00

[52] U.S. Cl. ..... 9/14; 273/95 A

[58] Field of Search ..... 9/14, 301, 311, 340; 272/1 B; 273/58, 65 EG, 65 R, 95 R, 58 R, 58 C, 95 A, 200 R

[56] References Cited

U.S. PATENT DOCUMENTS

| | | | |
|---|---|---|---|
| 292,281 | 1/1884 | Brewster | 9/14 |
| 1,089,617 | 3/1914 | Adams | 9/311 |
| 2,192,203 | 3/1940 | Purdy | 9/14 |
| 3,604,033 | 9/1971 | Lino | 9/340 |

FOREIGN PATENT DOCUMENTS

| | | | |
|---|---|---|---|
| 1,037,904 | 8/1958 | Fed. Rep. of Germany | 9/14 |
| 15,883 of | 1906 | United Kingdom | 9/14 |

*Primary Examiner*—Trygve M. Blix
*Assistant Examiner*—Jesus D. Sotelo
*Attorney, Agent, or Firm*—Samuel Lebowitz

[57] ABSTRACT

A lifesaving device including a water floatable member to which is attached a lifeline, the floatable member or body being sized as to be conveniently held in one hand by the user and thrown with relatively complete accuracy to a person in need in the water, the water floatable member being characterized further by having sufficient weight to permit it readily to be thrown a considerable distance.

10 Claims, 3 Drawing Figures

LIFESAVING DEVICE

Matter enclosed in heavy brackets [ ] appears in the original patent but forms no part of this reissue specification; matter printed in italics indicates the additions made by reissue.

BACKGROUND OF THE INVENTION

Various types of buoyant lifesaving devices are known in the art. Some of these devices are of relatively simple construction, as for example, the conventional and widely used buoyant life ring which is generally made in the shape of an annulus. Others of such devices, as for example, those disclosed in U.S. Pat. Nos. 1,089,617 and 2,137,468 are relatively complex in construction, expensive to make, and as such are not particularly attractive to a potential user, i.e. pool owners, boat owners, etc. Further, such devices as are known in the prior art do not readily lend themselves to convenient and rapid employment by a user in the event of an emergency at a swimming pool, beach or on board a vessel. Principally, the drawback of prior art lifesaving devices stems from the relatively large bulk of the same and the difficulty a user encounters when handling the device generally, and more particularly, when required to throw it a given distance to a person in peril in the water. Thus, for example, the buoyant lifeline disclosed in U.S. Pat. No. 292,281 while quite well suited for the purposes of assisting a person in the water in remaining afloat, is so bulky as to be extremely difficult for a person to quickly remove it from a rack on board a ship or at poolside and then throw the same any appreciable distance so that the device can be grasped by the person in need in the water. In other words, a device of that type is difficult to throw to the immediate proximity of a person in difficulty, and if such person be a nonswimmer and the device has not been thrown to a location within his reach, the device may be of no assistance at all.

SUMMARY OF THE INVENTION

The present invention relates to a lifesaving device which is particularly suited for use at any water activity where a swimmer or nonswimmer may be in need of assistance. Thus, the device of the invention can be conveniently stored on a peg at poolside, or on board a ship or can even be left laying in coiled condition adjacent the water's edge at a pool, pier, or beach. The device is of particularly advantageous construction in that it conveniently and quickly can be employed by one going to the assistance of a person in difficulty in the water and can be thrown for a considerable distance in the fashion of a football or basketball, since the device includes a water floatable body that is readily held in a person's hand being so fashioned that the average user can direct and throw the device with considerable accuracy enhancing the likelihood of placement of the water floatable body in immediate proximity to the person in difficulty in the water. The water floatable body serves to carry a lifeline to the person which lifeline can be used to haul the person to safety. Additionally, the device embodies characteristics of simplicity of construction, economy in manufacture and effectiveness of purpose when used for a lifesaving task.

In accordance with the invention, the lifesaving device includes a water floatable body which can be comprised of a shaped core of resilient material about which a length of a synthetic thermoplastic material rope has been wound in an encircling course, the combination of a shaped core and particularly the thermoplastic material rope being employed for the purpose of giving a certain weight to the water floatable body to facilitate the user's ability to throw the same an appreciable distance with relative ease and facility. The water floatable body also includes a shell of resilient material, the shell and overall contour of the water floatable body in a particularly advantageous embodiment, being provided in the form of an ellipsoid, there being a bulking mass of a buoyant material having a specific gravity of less than 1.0 disposed within the shell and around and completely encasing the core and winding thereon, with the resilient shell being in contiguous and closely covering conformity with the mass of buoyant material. "Contiguous" should be understood as meaning covering the total peripheral expanse of the body. The buoyant material additionally serves to give a relatively cushioned structure to the device. The water floatable body is made such as to have a passage extending completely therethrough, the expanse of the passage being defined between a pair of openings which are disposed at oppositely positioned locations in the shell. The device further includes an elongated lifeline securely connected with the water-floatable body and which includes a terminal length portion extending through the passage in the body, there being an extension length part of said terminal length disposed extending exteriorily of the body in a loop closely adjacent the body between the openings. The loop thus serves as a hand hold for the person in the water to whom the device has been thrown to aid them in holding onto the device as the rescue effort is being made. The loop of the terminal length of lifeline which extends from adjacent one of said shell openings to the other, can be secured to the remainder length of the lifeline by knotting the bitter end of the said terminal length extension part to the lifeline remainder length of the lifeline adjacent the said other opening in the shell. Furthermore, stop means are carried on the terminal length portion to prevent withdrawal separation of such terminal length portion from the body passage thus insuring that the connection between the body and lifeline cannot be broken. Conveniently said stop means are provided by knots in the terminal length portion located at the exterior of the body adjacent each shell opening.

Various types of materials can be employed for the respective components of the lifesaving device, the buoyant material, for example, being kapok, cork or a foamed urethane material. Both the core and the shell components can be made from any suitable resilient material, soft rubber being preferred.

It also is advantageous to provide a resilient sleeve extending through the body passage and in which the terminal length portion of the lifeline is received. Further the sleeve desirably is joined at its opposite ends in watertight connection with the shell to thus constitute the body a fully-watertight structure.

An important consideration is that the synthetic thermoplastic material rope which is wound about the shaped core be made from polyethylene or a like material since this material, in addition to weighting the water floatable body to permit effective throwing of the body over an appreciable distance, has a high degree of strength and itself is capable of floating in water. Thus the water floatation properties of the body are in no way diminished by inclusion therein of a component required for weighting purposes. Additionally, the elongated lifeline can also be provided as a length of polyethylene or like material rope so that all together the device is water floatable per se, and embodies characteristics of compactness, strength and ease of handling when required for use.

The invention accordingly comprises the lifesaving device possessing the features, properties and relation of elements which will be exemplified in the device hereinafter described and the scope of the invention will be indicated in the claims.

BRIEF DESCRIPTION OF THE DRAWING

Other objects of the invention will be in part obvious and will in part appear from the following detailed description taken in conjunction with the accompanying drawing wherein like reference numerals identify like parts throughout and in which.

DESCRIPTION OF THE PREFERRED EMBODIMENTS

Figure 1:
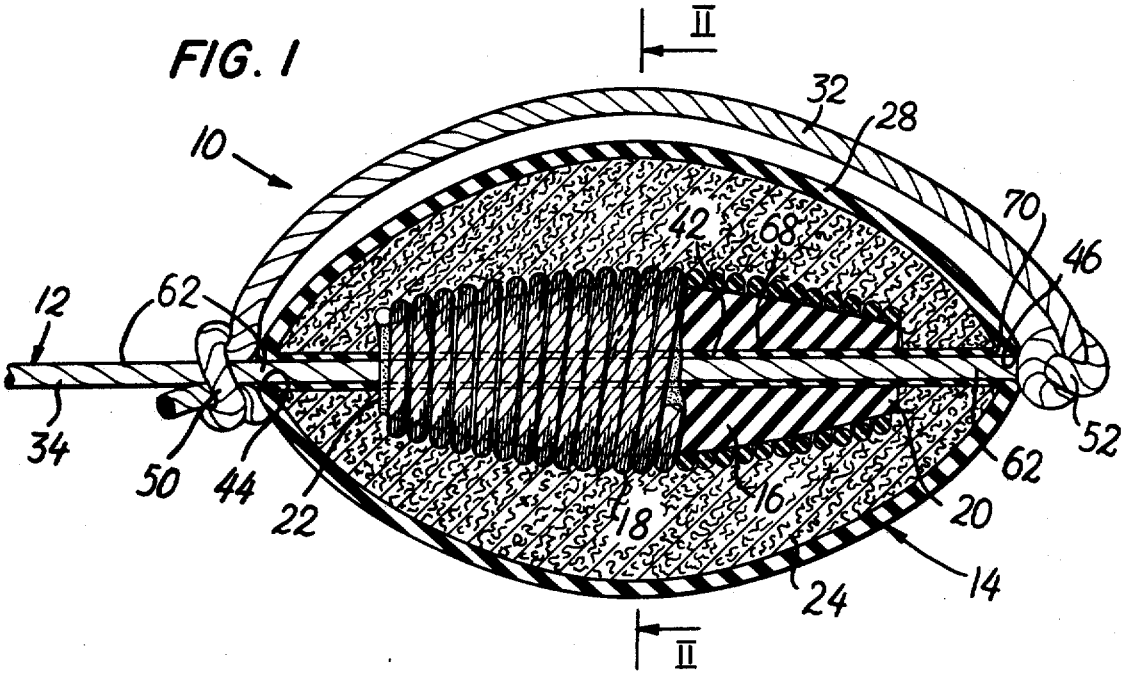
FIG. 1 is a longitudinal sectional view of a lifesaving device constructed in accordance with the principles of the present invention, portions of the core member and lifeline being shown in full to depict constructional aspects of the device.
Figure 2:
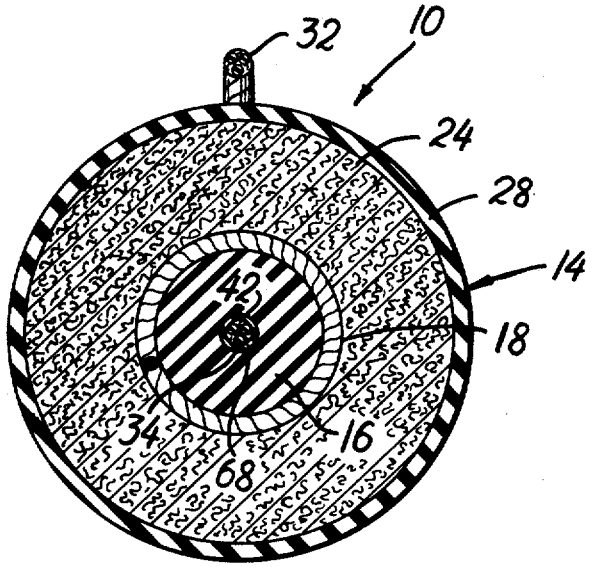
FIG. 2 is a transverse sectional view of the device as taken along the line II—II in FIG. 1.

Referring now to FIGS. 1 and 2 of the drawing, there is depicted a lifesaving device 10 which is particularly suited for lifesaving purposes in that it is compact in size and very easily handled by a person going to the aid of another in difficulty in the water in that the device can be readily held in the user's hand and thrown for a considerable distance to placement in the region of the person in difficulty so that the person can then grasp the device and be hauled to safety with the lifeline 12 securely connected to the water floatable body 10. In a particularly advantageous form, the device can be provided with a water floatable body 14 that is substantially ellipsoidal in shape and which has an overall major axis length of about 8 inches and a dimension along the minor axis of about 6 inches. These dimensions it should be noted allow for the user holding and tossing the body 14 in much like the fashion one handles a football or basketball. Of course within the scope of the invention the water floatable body could be made in other shapes, for example, as a spheroid, or an elongated cylinder.

As mentioned, the device includes a water floatable body 14 comprised of a number of separate components. Thus, the water floatable body 14 includes a central, preferably solid core 16 of a resilient material, desirably one which is itself water floatable and soft but yet possessed of sufficient inherent shape retention properties to provide a winding structure about which can be wound a length of synthetic thermoplastic material rope 18 in an encircling course on the core, the rope being employed to give a certain weight to the device. The pitch of the windings as well as the size of rope 18 can be varied to a considerable degree as long as sufficient bulking and weighting of the device is achieved. Additionally, the rope windings can be secured to the core in any convenient manner, e.g. by means of an adhesive. In general, the core 16 can approximate the overall configuration of the body 14, being somewhat eliptical in plan section, with the ends thereof truncated as at 20, 22. The synthetic thermoplastic material rope length 18 as is indicated, is wound in a plurality of windings about the core and desirably can be provided from a length of polyethylene rope, polyethylene having the advantage of being water floatable. The core 16 it will be noted desirably extends axially centrally within body 14.

Completely encasing the core 16 and rope windings 18 is a filter or mass of buoyant material 24 which has a specific gravity of less than 1.0 and which in one form can be a mass of kapok although other materials responding to the specific gravity requirement could be used including cork and foamed urethanes. The mass can, e.g., be a single shaped-structure. Disposed at the outside of the mass 24 of buoyant material is a shell 28 of resilient material, for example, soft rubber, which fully encloses said mass 24 and closely conforms to the contour thereof. In terms of relative dimensions, for a device having a water floatable body of the size noted above, the core 16 can have a maximum dimension along its minor axis of about 1½ to 2 inches and a major axis length of about 4 to 5 inches. In a particular embodiment, the core and windings can have a maximum diameter of about 3½ inches.

The device 10 also includes a lifeline 12 which comprises a terminal length portion 62 and a remainder length part 34, the remainder length part 34 being provided in such footage as desired, for example a 50 foot length of polyethylene one-half inch rope. The terminal length portion 62 extends through a passage 42 formed in the water floatable body which passage extends between openings 44 and 46 formed in shell 28, the terminal length portion 62 being provided with stop means 50, 52 of dimensions greater than those of the openings 44, 46 and passage 42 for preventing withdrawal separation of the lifeline terminal length portion from said body passage so that the lifeline always remains connected with the floatable body. Conveniently, the stop means can comprise knots in the terminal length portion at the exterior of the body adjacent each of openings 44, 46. Terminal length portion 62 also includes an extension length part 32 extending exteriorly of the body 14 in a loop closely adjacent the body between openings 44, 46. The bitter end of extension length part 32 can be fixedly secured to the lifeline such securement conveniently being formed by knotting the bitter end to provide the stop means 50. Additionally stop means 52 also can be formed as a knot at the other side of body 14.

Advantageously, the floatable body 14 is provided with a totally water tight character by including a resilient sleeve 68 extending through the passage therein, with the terminal length portion 62 being received in the sleeve 68. When both the sleeve and shell are made of rubber, the sleeve can be made integrally with the shell structure or otherwise secured with the shell at its opposite ends in a water tight connection therewith.

When it is desired to use the device of the present invention, the user merely picks up the water floatable body component and by means of an action similar to that employed when throwing a football or basketball throws the water floatable body to a person in difficulty in the water, thus placing the water floatable body 14 and lifeline 12 in a position where it can conveniently be grasped by the person in difficulty so such person can be then pulled to safety with that part of the lifeline retained in the grasp of the thrower.

While there is disclosed but one embodiment of the device of the present invention, it will be apparent that certain modifications can be made therein, for example, the buoyant material 24 need not be a shaped single-structure encasing the core 16, but rather could be provided as a relatively large particle size particulate mass. Additionally, the terminal length of the lifeline need not be looped about the water floatable body since the water floatable body is sufficiently soft for the person to retain a good grasp on the same. Similarly the softness of the floatable body structure obviates any substantial harm to the person in the water should he by chance by struck by the same when it is thrown.

What is claimed is:

[1. A lifesaving device including a waterfloatable elongated body comprising an elongated shaped core of resilient material, there being a length of a synthetic thermoplastic material rope wound in a encircling course about said core, a mass of a buoyant material having a specific gravity of less than 1.0 disposed around and completely encasing said core and the windings thereon, a shell of a resilient material enclosing said mass of buoyant material in contiguous and closely covering conformity therewith, said core being disposed longitudinally axially within said shell, said body having a central passage extending completely through said mass of material and said core between a pair of openings disposed at oppositely disposed locations in said shell, and an elongated lifeline securely connected with said body, said lifeline having a terminal length portion extending through said passage.]

[2. The lifesaving device of claim 1 in which said body is in the shape of an ellipsoid.]

[3. The lifesaving device of claim 1 in which said buoyant material is one of kapok, cork and a foamed urethane.]

[4. The lifesaving device of claim 1 in which the rope wound about said core is polyethylene.]

[5. The lifesaving device of claim 1 in which said core is rubber.]

[6. The lifesaving device of claim 1 in which said shell is rubber.]

[7. The lifesaving device of claim 1 further comprising a sleeve of resilient material extending through said body passage and joined at its opposite ends in watertight connection with said shell, said lifeline terminal length portion being received in said sleeve.]

[8. The lifesaving device of claim 7 in which said shell is rubber, said sleeve being rubber and joined integrally with said shell.]

[9. The lifesaving device of claim 1 in which said mass of material is present as a single shaped-structure encasing said core and the winding thereon.]

[10. A lifesaving device including a water-floatable elongated body comprising an elongated shaped core or resilient material, there being a length of a synthetic thermoplastic material rope wound in an encircling course about said core, a mass of a bouyant material having a specific gravity of less than 1.0 disposed around and completely encasing said core and the windings thereon, a shell of a resilient material enclosing said mass of buoyant material in contiguous and closely covering conformity therewith, said core being disposed longitudinally axially within said shell, said body having a central passage extending completely through said mass of material and said core between a pair of openings disposed at oppositely disposed locations in said shell, and an elongated lifeline securely connected with said body, said lifeline having a terminal length portion extending through said passage, said device further comprising stop means carried on said terminal length portion of said lifeline and being of dimension greater than those of the said openings and said body passage for preventing withdrawal separation of said lifeline terminal length portion from said body passage.]

[11. The following device of claim 10 in which said stop means comprises knots in said lifeline terminal length portion and located at the exterior of said body adjacent said pair of openings.]

[12. A lifesaving device including a water-floatable elongated body comprising an elongated shaped core of resilient material, there being a length of a synthetic thermoplastic material rope wound in an encircling course about said core, a mass of a buoyant material having a specific gravity of less than 1.0 disposed around and completely encasing said core and the windings thereon, a shell of a resilient material enclosing said mass of buoyant material in contiguous and closely covering conformity therewith, said core being disposed longitudinally axially within said shell, said body having a central passage extending completely through said mass of material and said core between a pair of openings disposed at oppositely disposed locations in said shell, and an elongated lifeline securely connected with said body, said lifeline having a terminal length portion extending through said passage, the terminal length portion of said lifeline including an extension length part extending exteriorly of said body and disposed in a loop closely adjacent said body between the respective pair of openings therein, said extension length part including a bitter end part secured to a remainder length portion of said lifeline.]

*13. A life-saving device of ellipsoidal shape resembling a football and adapted to be gripped and thrown like one towards a person in distress in a body of water, comprising*

*(a) a central core of predetermined weight and a mass of solid buoyant material with a yielding and waterproof exterior surrounding said core, to impart to the entire device a specific gravity lower than 1.0 so that it has the combined capability of floating on the body of water and being thrown as far and as accurately as a football,*

*(b) said device having a central passage extending therethrough along its longitudinal axis, and*

*(c) a rope lifeline having one end thereof extending through said passage for secure attachment to said device, which upon grasping by said person permits pulling of the person from the opposite end of said lifeline.*

*14. A device as set forth in claim 13, wherein said mass of buoyant material is of foamed solid material and of a specific gravity less than 1.0.*

*15. A device as set forth in claim 13, wherein said mass of buoyant material is a molded body of foamed urethane.*

*16. A device as set forth in claim 13, wherein the exterior of said mass of buoyant material is constituted by a resilient shell of soft and resilient material.*

*17. A device as set forth in claim 16, wherein said shell is formed of soft rubber.*

*18. A device as set forth in claim 13, wherein said attached end of the lifeline extends through said central passage whereat the same is knotted at the outlet of said passage to secure its permanent attachment.*

*19. A device as set forth in claim 18, wherein said lifeline extends beyond the knot at the outlet of said passage towards the inlet end thereof whereat the same is knotted to the main portion of the lifeline to provide a length of rope extending along an external element of said ellipsoidal body for convenient grasping by the person in distress.*

*20. A device as set forth in claim 18, wherein said central core is formed of rubber with a winding of rope of synthetic plastic-material on its exterior from one end ot the opposite end thereof.*

*21. A device as set forth in claim 18, wherein the central passage extending through said device is a hollow integral sleeve passing through said core with the opposite ends thereof integrally connected to the exterior of said mass of buoyant material in water-tight relation thereto.*

*22. A life-saving device of ellipsoidal shape resembling a football and adapted to be thrown like one towards a person in distress in a body of water, comprising*

*(a) a central core of resilient material of predetermined weight surrounded by a winding of rope of synthetic thermoplastic material from one end to the other end thereof;*

*(b) a mass of buoyant material with a yielding and waterproof exterior surrounding said core, to impart to the entire device a specific gravity lower than 1.0 so that it has the combined capability of floating on the body of water and being thrown as far and as accurately as a football,*

*(c) said device having a central passage extending therethrough along its longitudinal axis, and*

*(d) a rope lifeline having one end thereof extending through said passage for secure attachment to said device, which upon grasping by said person permits pulling of the person from the opposite end of said lifeline.*

* * * * *